(12) United States Patent
Fujishiro et al.

(10) Patent No.: US 10,349,276 B2
(45) Date of Patent: Jul. 9, 2019

(54) COMMUNICATION METHOD, BASE STATION AND USER TERMINAL

(71) Applicant: KYOCERA CORPORATION, Kyoto (JP)

(72) Inventors: Masato Fujishiro, Yokohama (JP); Yushi Nagasaka, Ritto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/891,515

(22) Filed: Feb. 8, 2018

(65) Prior Publication Data

US 2018/0167814 A1 Jun. 14, 2018

Related U.S. Application Data

(63) Continuation of application No. PCT/JP2016/073296, filed on Aug. 8, 2016.

(30) Foreign Application Priority Data

Aug. 11, 2015 (JP) .................................. 2015-159052

(51) Int. Cl.
*H04W 12/00* (2009.01)
*H04W 12/06* (2009.01)
(Continued)

(52) U.S. Cl.
CPC ......... *H04W 12/06* (2013.01); *H04L 63/0876* (2013.01); *H04W 72/04* (2013.01);
(Continued)

(58) Field of Classification Search
CPC ... H04W 12/06; H04W 76/27; H04W 72/085; H04W 88/06; H04W 12/04; H04W 24/10; H04L 63/0876
See application file for complete search history.

(56) References Cited

U.S. PATENT DOCUMENTS

2014/0181904 A1 6/2014 Craig et al.
2015/0350988 A1* 12/2015 Himayat ............... H04W 36/22
 370/331
(Continued)

OTHER PUBLICATIONS

International Search Report issued in PCT/JP2016/073296; dated Oct. 11, 2016.
(Continued)

*Primary Examiner* — Pakee Fang
(74) *Attorney, Agent, or Firm* — Studebaker & Brackett PC

(57) ABSTRACT

A communication method according to an embodiment comprises: generating, by a base station, authentication information to be used for authentication processing between a WLAN apparatus and a radio terminal; transmitting, by the base station, a WT ADDITION REQUEST to the WLAN apparatus on the Xw interface, wherein the WT ADDITION REQUEST includes the authentication information and a WLAN media access control (MAC) address of the radio terminal; receiving, by the WLAN apparatus, the WT ADDITION REQUEST from the base station on the Xw interface; transmitting, by the base station, an Radio Resource Control (RRC) message including information for deriving the authentication information, to the radio terminal; receiving, by the radio terminal, the RRC message from the base station; deriving, by the radio terminal, the authentication information based on the information included in the RRC message; and performing, by the radio terminal, the authentication processing by using the authentication information.

2 Claims, 14 Drawing Sheets

(51) Int. Cl.
　　　H04W 72/04　　　(2009.01)
　　　H04W 84/12　　　(2009.01)
　　　H04W 88/06　　　(2009.01)
　　　H04W 76/20　　　(2018.01)
　　　H04W 76/27　　　(2018.01)
　　　H04L 29/06　　　(2006.01)
　　　H04W 72/08　　　(2009.01)
　　　H04W 12/04　　　(2009.01)
　　　H04W 24/10　　　(2009.01)
(52) U.S. Cl.
　　　CPC ......... *H04W 72/085* (2013.01); *H04W 76/20* (2018.02); *H04W 76/27* (2018.02); *H04W 84/12* (2013.01); *H04W 88/06* (2013.01); *H04W 12/04* (2013.01); *H04W 24/10* (2013.01)

(56) References Cited

U.S. PATENT DOCUMENTS

2016/0057237 A1* 2/2016 Yang ................. H04L 67/16 709/224
2016/0302064 A1* 10/2016 Tsai ................. H04W 12/06

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V13.0.0; Jun. 2015; pp. 1-254; Release 13; 3GPP Organizational Partners.
CATT; Further Discussion on UP Architecture of LTE/WLAN Aggregation; 3GPP TSG RAN WG2 Meeting #90; R2-152100; May 25-29, 2015; pp. 1-6; Fukuoka, Japan.
Nokia Networks; ANR for WLAN cell detection; 3GPP TSG-RAN WG2 Meeting #90; R2-152102; May 25-29, 2015; pp. 1-4; Fukuoka, Japan.
CATT; Discussion on Architectural and Procedure of C-plane for LTE-WLAN Aggregation; 3GPP TSG RAN WG2 Meeting #90; R2-152125; May 25-29, 2015; pp. 1-5; Fukuoka, Japan.
CMCC; MRJC progress on interface between LTE and WLAN; 3GPP TSG-RAN WG2 Meeting #90; R2-152587; May 25-29, 2015; pp. 1-2; Fukuoka, Japan.
Intel Corporation; WLAN authentication and security aspects of LTE/WLAN aggregation; 3GPP TSG-RAN2 Meeting #90; R2-152775; May 25-29, 2015; pp. 1-7; Fukuoka, Japan.

* cited by examiner

US 10,349,276 B2

COMMUNICATION METHOD, BASE STATION AND USER TERMINAL

RELATED APPLICATIONS

This application is a continuation application of international application PCT/JP2016/073296, filed Aug. 8, 2016, which claims benefit of JP Patent Application 2015-159052, filed Aug. 11, 2015, the entirety of all applications hereby expressly incorporated by reference.

TECHNICAL FIELD

The present disclosure relates to a radio terminal, a base station, and a WLAN apparatus in a system that links a WLAN and a WWAN.

BACKGROUND ART

In recent years, a radio terminal that supports both communication methods including wireless wide area network (WWAN) communication and wireless local area network (WLAN) communication has become popular. For providing such a radio terminal with high-speed and high-capacity communication service, a technique for enhancing linkage between a WWAN and a WLAN is considered.

SUMMARY

A communication method according to an embodiment comprises: generating, by a base station configured to include a Wireless Wide Area Network (WWAN), authentication information to be used for authentication processing between a WLAN apparatus configured to include a Wireless Local Area Network (WLAN) and a radio terminal configured to support WWAN-WLAN aggregation in which communication by using of the WWAN and the WLAN is performed; transmitting, by the base station, a WT ADDITION REQUEST to the WLAN apparatus on the Xw interface, wherein the WT ADDITION REQUEST includes the authentication information and a WLAN media access control (MAC) address of the radio terminal; receiving, by the WLAN apparatus, the WT ADDITION REQUEST from the base station on the Xw interface; transmitting, by the base station, an Radio Resource Control (RRC) message including information for deriving the authentication information, to the radio terminal; receiving, by the radio terminal, the RRC message from the base station; deriving, by the radio terminal, the authentication information based on the information included in the RRC message; and performing, by the radio terminal, the authentication processing by using the authentication information.

A base station according to an embodiment is a base station configured to include a Wireless Wide Area Network (WWAN). The base station comprises a controller. The controller is configured to: generate authentication information to be used for authentication processing between a WLAN apparatus configured to include a Wireless Local Area Network (WLAN) and a radio terminal configured to support WWAN-WLAN aggregation in which communication by using the WWAN and the WLAN is performed; transmit a WT ADDITION REQUEST to the WLAN apparatus on an Xw interface, wherein the WT ADDITION REQUEST includes the authentication information and a WLAN media access control (MAC) address of the radio terminal; and transmit an Radio Resource Control (RRC) message including information for deriving the authentication information, to the radio terminal.

A radio terminal according to an embodiment is a radio terminal configured to support WWAN-WLAN aggregation in which communication by using of a Wireless Wide Area Network (WWAN) and a Wireless Local Area Network (WLAN) is performed. The radio terminal comprises a controller. The controller is configured to: receive an Radio Resource Control (RRC) message including information for deriving authentication information from a base station, wherein the authentication information is to be used for authentication processing between a WLAN apparatus configured to include the WLAN and the radio terminal; derive the authentication information based on the information included in the RRC message; and performing the authentication processing by using the authentication information.

DESCRIPTION OF EMBODIMENTS

Overview of Embodiment

Figure 1:
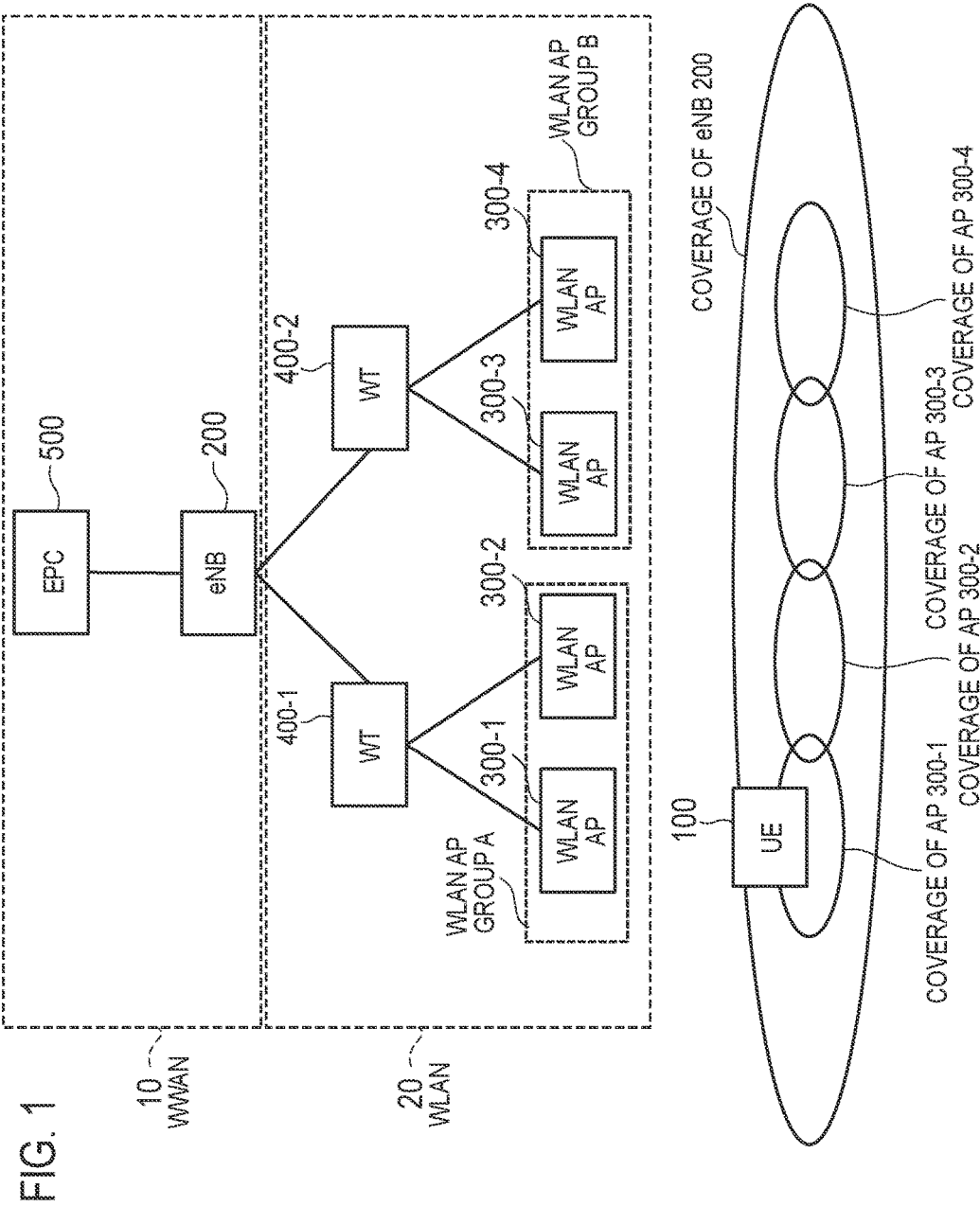
FIG. 1 is a diagram illustrating a configuration of a communication system according to first to fourth embodiments.

A radio terminal according to an embodiment has capability of both communication of a wireless wide area network (WWAN) and communication of a wireless local area network (WLAN). The WLAN includes an entity of a predetermined layer positioned in a higher layer of a WLAN media access control (MAC) layer. The radio terminal comprising: a controller configured to notify the entity of the predetermined layer of terminal identification information of the own radio terminal when performing access to the WLAN in a state in which the own radio terminal is connected to a WWAN base station.

The radio terminal may have capability of WWAN-WLAN aggregation that simultaneously uses communication of the WWAN and communication of the WLAN, and the entity of the predetermined layer may be an entity to which data addressed to the radio terminal is transferred from the WWAN base station in the WWAN-WLAN aggregation.

The terminal identification information may be temporary terminal identification information allocated to the own radio terminal from the WWAN base station or the WLAN.

The controller may perform: processing of acquiring the temporary terminal identification information from the WWAN base station; and processing of notifying the entity of the predetermined layer of the temporary terminal identification information when performing access to the WLAN in a state in which the own radio terminal is connected to the WWAN base station.

The entity of the predetermined layer may be a WLAN logical link control (LLC) entity, and the controller may notify the WLAN LLC entity of the terminal identification information by including the terminal identification information in an LLC header and/or a subnetwork access protocol (SNAP) header transmitted to the WLAN by the own radio terminal.

The entity of the predetermined layer may be an adaptation layer entity defined by a WWAN standard, and the controller may notify the adaptation layer entity of the terminal identification information by including the terminal identification information in an adaptation layer control protocol data unit (PDU) transmitted to the WLAN by the own radio terminal.

A WLAN apparatus according to an embodiment is a WLAN apparatus included in a wireless local area network (WLAN). The WLAN apparatus comprises: a controller including an entity of a predetermined layer positioned in a higher layer of a WLAN media access control (MAC) layer. The entity of the predetermined layer identifies a radio terminal based on terminal identification information of which the radio terminal notifies the entity of the predetermined layer when the radio terminal accesses the WLAN.

A radio terminal according to an embodiment supports WWAN-WLAN aggregation that simultaneously uses communication of a wireless wide area network (WWAN) and communication of a wireless local area network (WLAN). The radio terminal comprises a controller configured to perform processing of transmitting terminal capability information on the capability of the radio terminal to the WWAN base station. The controller includes terminal identification information fixedly assigned to the own radio terminal in the capability information.

The terminal identification information may be a WLAN media access control (MAC) address of the own radio terminal The controller may include the terminal identification information in the terminal capability information when the own radio terminal has the capability of WWAN•WLAN aggregation that simultaneously uses the communication of the WWAN and the communication of the WLAN.

A WLAN apparatus according to an embodiment is a WLAN apparatus included in a wireless local area network (WLAN). The WLAN apparatus comprises a controller configured to store authentication information used for authentication processing with a radio terminal connected to a wireless wide area network (WWAN) base station and terminal identification information of the radio terminal. The controller associates the terminal identification information with the radio terminal when the radio terminal accesses its own WLAN apparatus and succeeds in the authentication processing using the authentication information.

The authentication information may be a PMK (Pairwise Master Key) provided from the WWAN base station or a PMK generated by the own WLAN device.

The terminal identification information may be terminal identification information for identifying the radio terminal on an interface between the WLAN device and the WWAN base station.

First Embodiment

A first embodiment will be described below.

In the first embodiment, the description will be given of an example in which a WWAN system is a Long Term Evolution (LTE) system. The LTE system is a system of which specification is formulated in a 3rd Generation Partnership Project (3GPP), which is a standardization project.

(System Configuration)

FIG. 1 is a diagram illustrating a configuration of a communication system according to the first embodiment.

As illustrated in FIG. 1, the communication system according to the first embodiment includes a user equipment (UE) 100, an evolved Node-B (eNB) 200, a WLAN access point (WLAN AP) 300, a WLAN Termination (WT) 400, and an evolved packet core (EPC) 500. The UE 100 corresponds to a radio terminal. The eNB 200 corresponds to a WWAN base station. The eNB 200 and the EPC 500 form a WWAN 10 (LTE network). The WLAN AP 300 and the WT 400 form a WLAN 20.

The UE 100 is a mobile apparatus that supports both communication methods including WWAN communication (LTE communication) and WLAN communication. The UE 100 has capability of WWAN-WLAN aggregation. A configuration of the UE 100 and WWAN-WLAN aggregation will be described later.

The eNB 200 is an apparatus that manages one or a plurality of cells, and performs LTE communication with the UE 100 connecting to the own cells. A configuration of the UE 100 will be described later.

The eNB 200 forms an Evolved-UMTS Terrestrial Radio Access Network (E-UTRAN). The eNB 200 is connected with a neighbour eNB via an X2 interface. The eNB 200 has a radio resource management (RRM) function, a routing function of user data (hereinafter, simply referred to as "data"), a measurement control function for mobility control and scheduling, and the like. A configuration of the eNB 200 will be described later. In addition, the "cell" is used as a term indicating the minimum unit of a radio communication area (coverage), and furthermore, also used as a term indicating a function of performing radio communication with the UE 100.

The WLAN AP 300 is an apparatus that performs WLAN communication with the UE 100 connecting to the own AP. FIG. 1 illustrates an example in which four WLAN APs 300-1 to 300-4 are provided in a cell coverage of the eNB 200. In addition, the eNB 200 may have a function of a WLAN AP. Such a scenario will be referred to as a collocated scenario.

The WT 400 is an apparatus that terminates an Xw interface being a direct interface with the eNB 200. The WT 400 can accommodate a plurality of WLAN APs 300. The WT 400 may accommodate only one WLAN AP 300. FIG. 1 illustrates an example in which a WT 400-1 accommodates two WLAN APs 300-1 and 300-2, and a WT 400-2 accommodates two WLAN APs 300-3 and 300-4.

In addition, the WLAN APs 300-1 and 300-2 form a WLAN AP group A. The WLAN APs 300-3 and 300-4 form a WLAN AP group B. FIG. 1 illustrates an example in which a WLAN AP group is formed by WLAN APs 300 accommodated in the same WT 400. Nevertheless, a WLAN AP group may be formed by WLAN APs 300 accommodated in different WTs 400. Here, a WLAN AP group refers to a group in which the UE 100 can autonomously perform switching control between WLAN APs 300 without depending on an instruction of the eNB 200. Using a WLAN mobility control function, the UE 100 can switch WLAN communication from one WLAN AP to another WLAN AP in the same WLAN AP group, transparently with respect to the eNB 200. On the other hand, the eNB 200 controls switching between different WLAN AP groups.

The EPC 500 is connected with the eNB 200 via an S1 interface. The EPC 500 corresponds to a core network. The EPC 500 includes a Mobility Management Entity (MME) and a Serving-Gateway (S-GW). The MME performs various types of mobility control for the UE 100, and the like. The S-GW performs transfer control of data.

(LTE Protocol)

Figure 2:
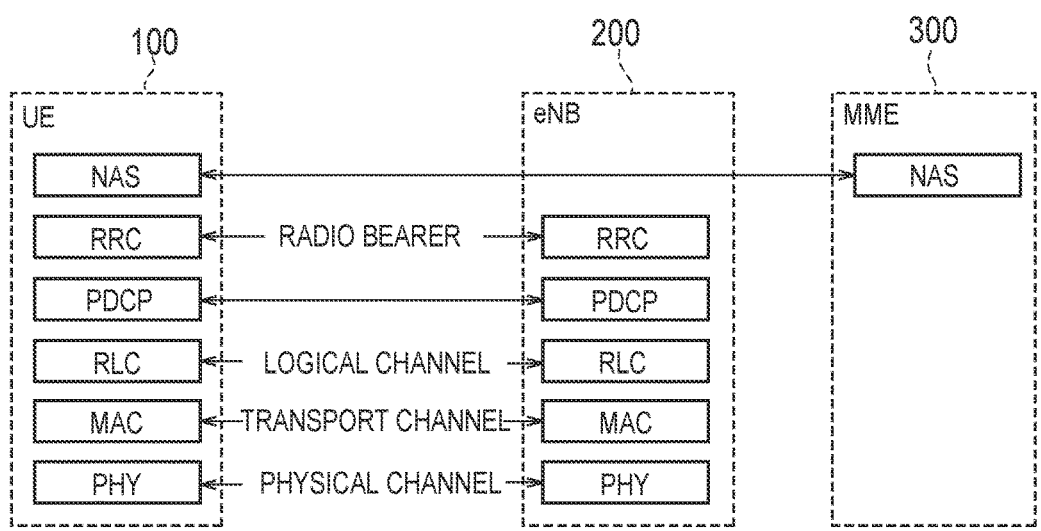
FIG. 2 is a protocol stack diagram of a radio interface in a Long Term Evolution (LTE) system.

FIG. 2 is a protocol stack diagram of a radio interface in the LTE system. As illustrated in FIG. 2, the radio interface protocol is classified into a first layer to a third layer of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, data and control signals are transmitted via a physical channel.

The MAC layer performs priority control of data, a re-transmission process by a hybrid ARQ (HARQ), a random access procedure, and the like. Between the MAC layer of the UE 100 and the MAC layer of the eNB 200, data and control signals are transmitted via a transport channel. The MAC layer of the eNB 200 includes a scheduler configured to determine a transport format (a transport block size and a modulation and coding scheme (MCS)) of an uplink and a downlink, and a resource block to be allocated to the UE 100.

The RLC layer uses functions of the MAC layer and the physical layer to transmit data to the RLC layer of a reception side. Between the RLC layer of the UE 100 and the RLC layer of the eNB 200, data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a message (RRC message) for various types of settings is transmitted. The RRC layer controls a logical channel, a transport channel, and a physical channel depending on the establishment, re-establishment, and release of a radio bearer. If a connection (RRC connection) is established between the RRC of the UE 100 and the RRC of the eNB 200, the UE 100 is in an RRC connected mode (connected mode), and if the connection is not established, the UE 100 is in an RRC idle mode (idle mode).

An NAS (Non-Access Stratum) layer positioned above the RRC layer performs session management, mobility management and the like.

(Configuration of Radio Terminal)

Figure 3:
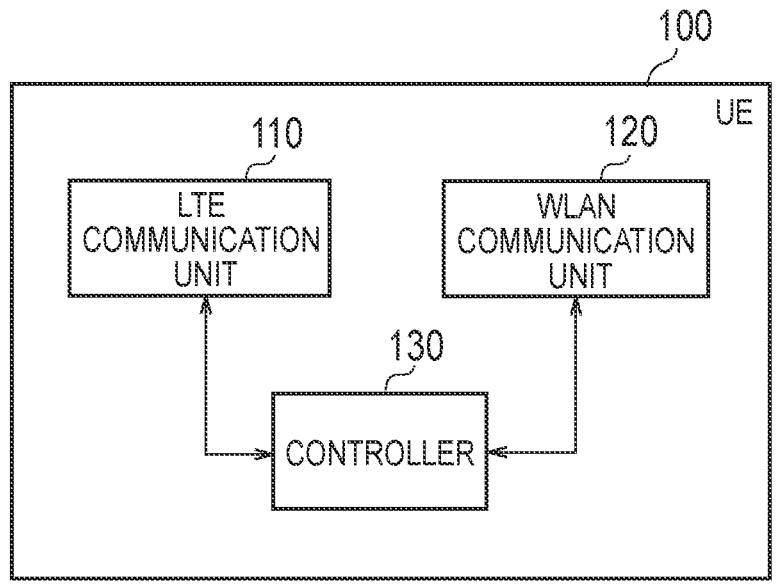
FIG. 3 is a block diagram of a user equipment (UE).

FIG. 3 is a block diagram of the UE 100 (radio terminal). As illustrated in FIG. 3, the UE 100 includes an LTE communication unit (WWAN communication unit) 110, a WLAN communication unit 120, and a controller 130.

The LTE communication unit 110 performs LTE communication under the control of the controller 130. The LTE communication unit 110 may execute part of an LTE protocol. The LTE communication unit 110 includes an antenna, a transmission device, and a receiving device. The transmission device converts a baseband signal (transmission signal) output by the controller 130, into an LTE radio signal, and transmits the LTE radio signal from the antenna. The receiving device converts an LTE radio signal received by the antenna, into a baseband signal (reception signal), and outputs the baseband signal to the controller 130. In addition, LTE communication is generally performed in a licensed band.

The WLAN communication unit 120 performs WLAN communication under the control of the controller 130. The WLAN communication unit 120 may execute part of a WLAN protocol. The WLAN communication unit 120 includes an antenna, a transmission device, and a receiving device. The transmission device converts a baseband signal (transmission signal) output by the controller 130, into a WLAN radio signal, and transmits the WLAN radio signal from the antenna. The receiving device converts a WLAN radio signal received by the antenna, into a baseband signal (reception signal), and outputs the baseband signal to the controller 130. In addition, WLAN communication is generally performed in an unlicensed band.

The controller 130 performs various types of control in the UE 100. The controller 130 may execute part of the LTE protocol, and may execute part of the WLAN protocol. The controller 130 includes a processor and a memory. The memory stores a program to be executed by the processor, and information to be used in processing performed by the processor. The processor may include a baseband processor that performs modulation/demodulation and encoding/decoding of a baseband signal, and the like, and a central processing unit (CPU) that executes programs stored in the memory, to perform various types of processing. The processor executes various types of processing to be described later.

(Configuration of Base Station)

Figure 4:
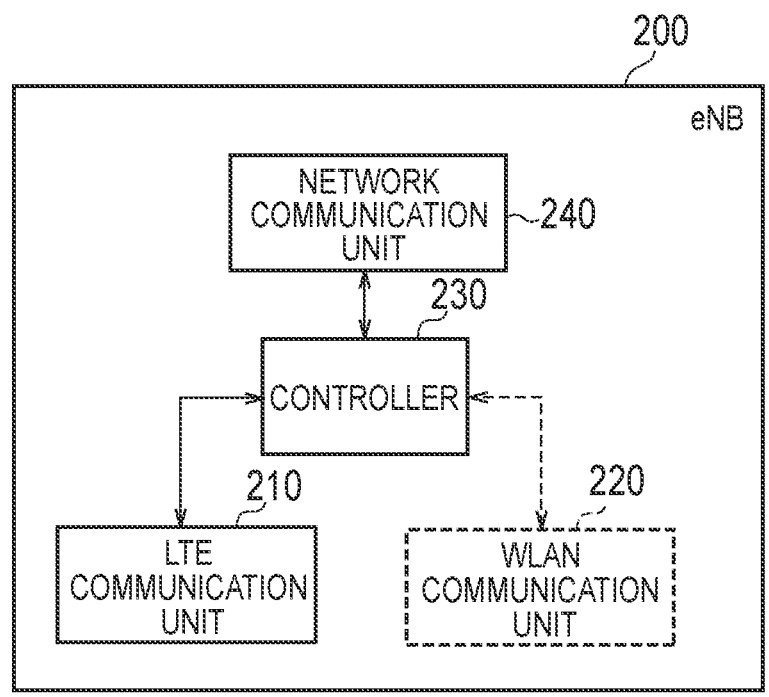
FIG. 4 is a block diagram of an evolved Node-B (eNB).

FIG. 4 is a block diagram of the eNB 200 (base station). As illustrated in FIG. 4, the eNB 200 includes an LTE communication unit (WWAN communication unit) 210, a controller 230, and a network communication unit 240. Here, in the case of the collocated scenario, the eNB 200 may include a WLAN communication unit 220.

The LTE communication unit 210 performs LTE communication under the control of the controller 230. The LTE communication unit 210 may execute part of an LTE protocol. The LTE communication unit 210 includes an antenna, a transmission device, and a receiving device. The transmission device converts a baseband signal (transmission signal) output by the controller 230, into an LTE radio signal, and transmits the LTE radio signal from the antenna. The receiving device converts an LTE radio signal received by the antenna, into a baseband signal (reception signal), and outputs the baseband signal to the controller 230.

The WLAN communication unit 220 performs WLAN communication under the control of the controller 230. The WLAN communication unit 220 may execute part of a WLAN protocol. The WLAN communication unit 220 includes an antenna, a transmission device, and a receiving device. The transmission device converts a baseband signal (transmission signal) output by the controller 230, into a WLAN radio signal, and transmits the WLAN radio signal from the antenna. The receiving device converts a WLAN radio signal received by the antenna, into a baseband signal (reception signal), and outputs the baseband signal to the controller 230.

The controller 230 performs various types of control in the eNB 200. The controller 230 may execute part of the LTE protocol, and may execute part of the WLAN protocol. The controller 230 includes a processor and a memory. The memory stores a program to be executed by the processor, and information to be used in processing performed by the processor. The processor may include a baseband processor that performs modulation/demodulation and encoding/decoding of a baseband signal, and the like, and a CPU that executes programs stored in the memory, to perform various types of processing. The processor executes various types of processing to be described later.

The network communication unit 240 is connected with a neighbour eNB 200 via the X2 interface, is connected with the EPC 500 (MME/S-GW) via the S1 interface, and is connected with the WT 400 via the Xw interface. The network communication unit 240 is used for communication performed on the X2 interface, communication performed on the S1 interface, communication performed on the Xw interface, and the like.

(Configuration of WLAN Apparatus)

Figure 5:
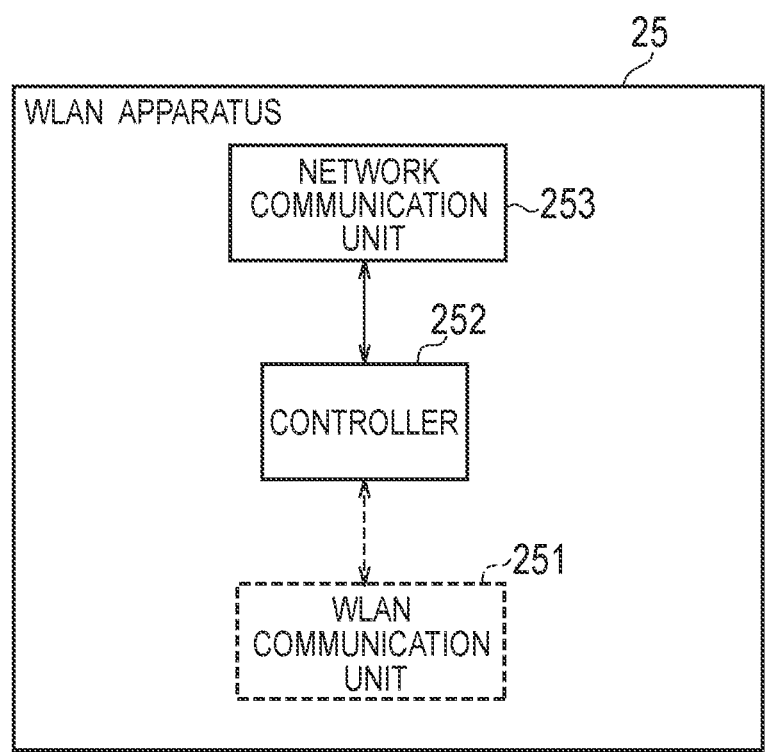
FIG. 5 is a block diagram of a WLAN apparatus.

FIG. 5 is a block diagram of a WLAN apparatus 25. The WLAN apparatus 25 is the WT 400. The WLAN apparatus 25 may be the WLAN AP 300 having a function of a WT.

As illustrated in FIG. 5, the WLAN apparatus 25 includes a WLAN communication unit 251, a controller 252, and a network communication unit 253. Here, the WLAN apparatus 25 needs not include the WLAN communication unit 251.

The WLAN communication unit 251 performs WWAN communication under the control of the controller 252. The WLAN communication unit 251 may execute part of a WLAN protocol. The WLAN communication unit 251 includes an antenna, a transmission device, and a receiving device. The transmission device converts a baseband signal (transmission signal) output by the controller 252, into a WLAN radio signal, and transmits the WLAN radio signal from the antenna. The receiving device converts a WLAN radio signal received by the antenna, into a baseband signal (reception signal), and outputs the baseband signal to the controller 252.

The controller 252 performs various types of control in the WLAN apparatus 25. The controller 252 may execute part of a WLAN protocol. The controller 252 includes a processor and a memory. The memory stores a program to be executed by the processor, and information to be used in processing performed by the processor. The processor may include a baseband processor that performs modulation/demodulation and encoding/decoding of a baseband signal, and the like, and a CPU that executes programs stored in the memory, to perform various types of processing. The processor executes various types of processing to be described later.

The network communication unit 253 is connected with the eNB 200 via the Xw interface, and is used for communication performed on the Xw interface, and the like.

(WWAN-WLAN Aggregation According to First Embodiment)

Figure 6:
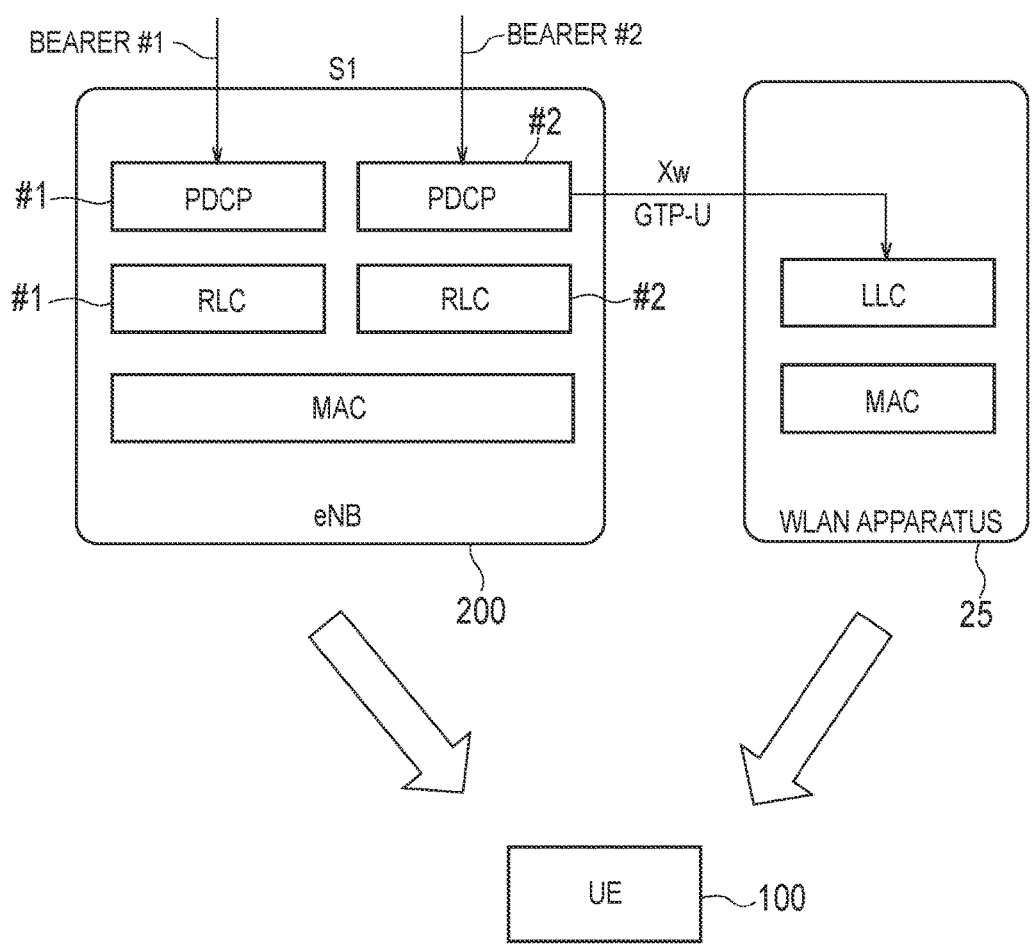
FIG. 6 is a diagram illustrating WWAN-WLAN aggregation according to the first embodiment.

FIG. 6 is a diagram illustrating WWAN-WLAN aggregation according to the first embodiment. The WWAN-WLAN aggregation of downlink will now be described. Nevertheless, WWAN-WLAN aggregation can be applied to uplink.

As illustrated in FIG. 6, the UE 100 has capability of LTE-WLAN aggregation that simultaneously uses communication with the WWAN 10 (the eNB 200) and communication with the WLAN 20 (the WLAN apparatus 25). In FIG. 6, data of a bearer #1 of the UE 100 is transmitted from the eNB 200 to the UE 100. In contrast to this, at least part of data of a bearer #2 of the UE 100 is transmitted from the eNB 200 to the UE 100 through the WLAN apparatus 25.

The eNB 200 includes an entity (PDCP entity) #1 of a PDCP layer corresponding to the bearer #1, and a PDCP entity #2 corresponding to the bearer #2.

The PDCP entity #1 processes data (PDCP SDU) of the bearer #1 that has been transferred on the S1 interface from the S-GW, and delivers the processed data (PDCP PDU) to an entity (RLC entity) #1 of an RLC layer. The RLC entity #1 acquires the data from the PDCP entity #1 as an RLC SDU, and delivers the processed data (RLC PDU) to an entity (LTE MAC entity) of an LTE MAC layer. The LTE MAC entity acquires the data from the RLC entity #1 as a MAC SDU, and transmits the processed data (MAC PDU) to the UE 100 via an entity (not illustrated) of a physical layer.

The PDCP entity #2 processes data (PDCP SDU) of the bearer #2 that has been transferred on the S1 interface from the S-GW, and transfers at least part of the processed data (PDCP PDU) to the WLAN apparatus 25 on the Xw interface. On the Xw interface, data of the UE 100 may be transferred using a GPRS Tunneling Protocol for User plane (GTP-U). Alternatively, IP tunneling may be used in place of the GTP-U. The remaining PDCP PDU is delivered to the RLC entity #2, and transmitted to the UE 100 through processing similar to the bearer #1.

The WLAN apparatus 25 includes an entity (WLAN LLC entity) of a WLAN logical link control (LLC) layer and an entity (WLAN MAC entity) of a WLAN media access control (MAC) layer. The WLAN LLC layer is positioned in a higher layer of the WLAN MAC layer. In the first embodiment, the WLAN LLC entity corresponds to an entity of a predetermined layer. The entity of the predetermined layer is an entity to which data addressed to the UE 100 is transferred from the eNB 200 in WWAN-WLAN aggregation.

The WLAN LLC entity processes data of the bearer #2 that has been transferred from the eNB 200, and delivers the processed data to the WLAN MAC entity. The WWAN MAC entity acquires the data from the WLAN LLC entity, and transmits the processed data to the UE 100 via an entity (not illustrated) of a physical layer.

(Operation According to First Embodiment)

An operation according to the first embodiment will be described below.

When starting WWAN-WLAN aggregation, the UE 100 performs access (initial access) to the WLAN 20 in a state of being connected to the eNB 200 (i.e., in an RRC connected mode). Here, the WLAN LLC entity of the WLAN apparatus 25 needs to associate UE identification information (hereinafter, "network ID") and the like that are to be used for the GTP-U with the eNB 200, with a UE 100 that has accessed the WLAN 20. Nevertheless, a method by which the WLAN LLC entity identifies a UE 100 that has accessed the WLAN 20 is unclear at the present moment.

Thus, when performing access to the WLAN 20 in a state in which the own UE 100 is connected to the eNB 200, the UE 100 notifies the WLAN LLC entity of terminal identification information (UE identification information) of the own UE 100. In the first embodiment, the UE 100 notifies the WLAN LLC entity of UE identification information by including the UE identification information in an LLC header and/or a subnetwork access protocol (SNAP) header transmitted by the own UE 100 to the WLAN 20. The WLAN LLC entity can thereby identify the UE 100 based on the UE identification information.

The UE identification information is temporary UE identification information allocated to the own UE 100 from the eNB 200 or the WLAN 20. The UE 100 performs processing of acquiring temporary UE identification information from the eNB 200, and processing of notifying the WLAN LLC entity of the temporary UE identification information when performing access to the WLAN 20 in a state in which the own UE 100 is connected to the eNB 200. The temporary UE identification information allocated to the UE 100 from the eNB 200 is, for example, a cell radio network temporary identifier (C-RNTI). In addition, the temporary UE identification information allocated to the UE 100 from the WLAN 20 may be referred to as a WLAN radio network temporary identifier (W-RNTI).

(1) LLC Header and SNAP Header

Figure 7:
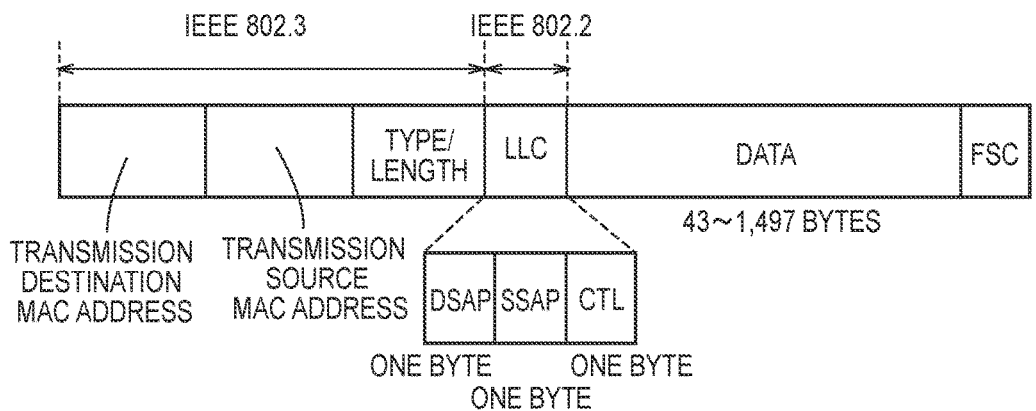
FIG. 7 is a diagram for illustrating a logical link control (LLC) header according to the first embodiment.

FIG. 7 is a diagram for illustrating the LLC header. The LLC is a protocol defined in the IEEE standard 802.2.

As illustrated in FIG. 7, the UE 100 transmits a MAC frame to the WLAN 20. The MAC frame may be referred to as an Ethernet (registered trademark, the same applies to the following) frame. The MAC frame includes a MAC header (Ethernet header) defined in the IEEE standard 802.3, the LLC header defined in the IEEE standard 802.2, data, and FSC. Here, an IEEE802.11 header may be used in place of the MAC header (Ethernet header). The MAC header (Ethernet header) includes fields of a transmission destination MAC address, a transmission source MAC address, and a type/length.

The LLC header includes a one-byte transmission destination service access point (DSAP) field, a one-byte transmission source service access point (SSAP) field, and a one-byte control (CTL) field. The service access point (SAP) is a term indicating a contact point used when service is exchanged between entities of the layers. The CTL field includes commands, responses, and sequence number information.

The SSAP field includes a U bit and a C/R bit. The U bit represents either "1" indicating that an address in the DSAP field is defined in the IEEE, or "0" indicating that the address is defined by a user. The C/R bit represents either "1" indicating that the SAP is a group address, or "0" indicating that the SAP is an individual address.

The DSAP field includes a U bit and an I/G bit. The U bit represents either "1" indicating that an address in the SSAP field is defined in the IEEE, or "0" indicating that the address is defined by a user. The I/G bit represents whether data is a command or a response.

Figure 8:
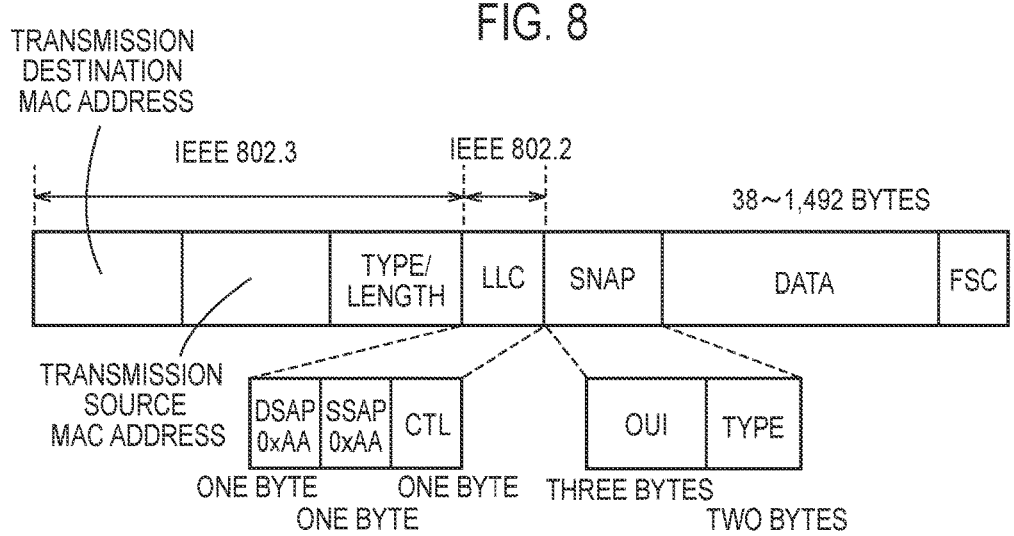
FIG. 8 is a diagram for illustrating a subnetwork access protocol (SNAP) header according to the first embodiment.

FIG. 8 is a diagram for illustrating the SNAP header according to the first embodiment. The SNAP is a protocol defined in the IEEE standard 802.2.

As illustrated in FIG. 8, the UE 100 transmits a MAC frame similar to that in FIG. 7, to the WLAN 20. Nevertheless, the MAC frame illustrated in FIG. 8 differs from that in FIG. 7 in that the MAC frame further includes the SNAP header. The SNAP header includes a three-byte organization unique identifier (OUI) field and a two-byte type field. The OUI includes an identifier that can be locally allocated. The type field includes information indicating a type (Ethernet, etc.) of a protocol of a higher layer.

(2) Operation Pattern 1

Figure 9:
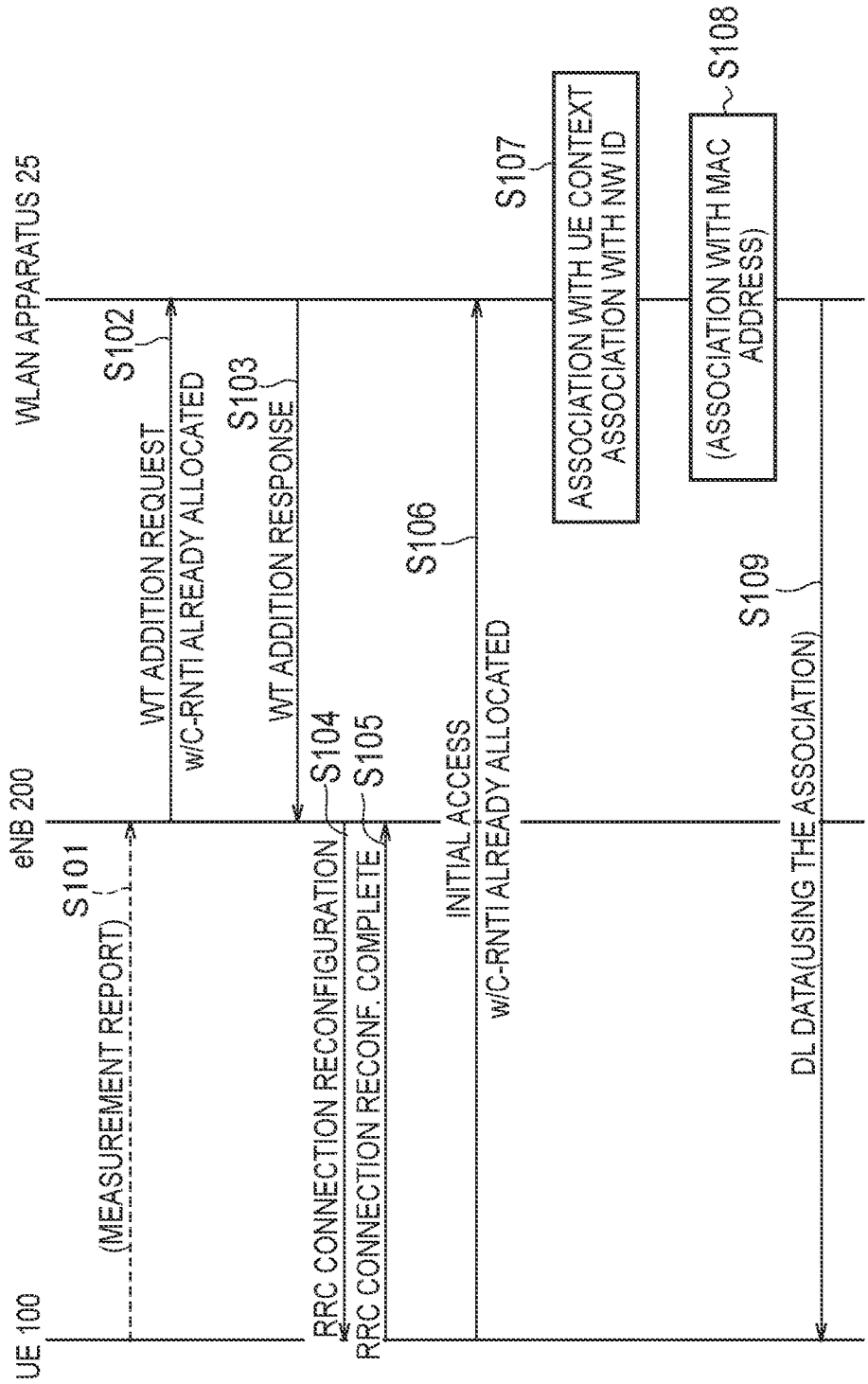
FIG. 9 is a sequence diagram illustrating an operation pattern 1 of the first embodiment.

FIG. 9 is a sequence diagram illustrating an operation pattern 1 of the first embodiment. In the operation pattern 1, temporary UE identification information is a C-RNTI. Previous to this sequence, the eNB 200 has already notified the UE 100 of a C-RNTI allocated to the UE 100.

As illustrated in FIG. 9, in Step S101, the UE 100 transmits, to the eNB 200, a measurement report (Measurement Report) including a measurement result for the WLAN 20 (the WLAN AP 300). Based on the measurement report (Measurement Report), the eNB 200 decides to start WWAN-WLAN aggregation. The eNB 200 may make the decision based on a determination criterion other than the measurement report (Measurement Report).

In Step S102, the eNB 200 transmits, to the WLAN apparatus 25, on the Xw interface, an addition request (WT Addition Request) for starting WWAN-WLAN aggregation. The addition request (WT Addition Request) includes context information (UE Context) of the UE 100. The UE Context includes a measurement result (Measurement Result) that is based on the measurement report (Measurement Report) of the UE 100, a list (ToAddMod list) of data radio bearers (DRBs) to be added or modified, a list (ToAddMod list) of SCells (WLAN cells) to be added or modified, UE capability information (UE Capability), and the like. The UE Context may include a radio configuration on the LTE side (Radio Resource Config Dedicated), a list (ToAddMod) of SCells (SCells of LTE) to be added or modified, information of transmission power, and the like.

In addition, the addition request (WT Addition Request) includes the C-RNTI that has been allocated to the UE 100 by the eNB 200. If the WLAN apparatus 25 receives the addition request (WT Addition Request), the WLAN apparatus 25 stores the UE Context and the C-RNTI of the UE 100. In addition, the WLAN apparatus 25 performs allocation of a network ID of the UE 100 to be used on the Xw interface. The network ID may be referred to as an "Xw AP UE ID".

In Step S103, the WLAN apparatus 25 transmits, to the eNB 200, on the Xw interface, a positive response (WT Addition Response) to the addition request (WT Addition Request). The positive response (WT Addition Response) includes the network ID allocated to the UE 100 by the WLAN apparatus 25. The eNB 200 receives the positive response (WT Addition Response).

In Step S104, the eNB 200 transmits, to the UE 100, a message requesting WLAN access for starting WWAN-WLAN aggregation. The UE 100 receives the message. The message is, for example, "RRC Connection Reconfiguration" being dedicated RRC signaling addressed to the UE 100. The "RRC Connection Reconfiguration" may include information indicating the WLAN apparatus 25 that the UE 100 is to access.

In Step S105, the UE 100 transmits, to the eNB 200, a positive response (RRC Connection Reconfiguration Complete) to the "RRC Connection Reconfiguration". The eNB 200 receives the "RRC Connection Reconfiguration Complete".

In Step S106, the UE 100 performs access (Initial Access) to the WLAN 20 based on the "RRC Connection Reconfiguration". Here, the UE 100 includes the C-RNTI in the LLC header and/or the SNAP header. More specifically, because the C-RNTI is two bytes, the UE 100 includes the C-RNTI in the SSAP field (one byte) and the DSAP field (one byte) in the LLC header. In this case, the C-RNTI needs to be allocated so that the above-described U bit becomes "0". Alternatively, the UE 100 includes the C-RNTI in the OUI field in the SNAP header.

The WLAN LLC entity of the WLAN apparatus 25 acquires the C-RNTI included in the LLC header and/or the SNAP header, and identifies the UE 100 that has accessed the WLAN 20, based on the C-RNTI. More specifically, the WLAN LLC entity determines that the C-RNTI included in the notification transmitted from the eNB 200 in Step S102, and the C-RNTI included in the LLC header and/or the SNAP header match.

In Step S107, the WLAN apparatus 25 associates the identified UE 100 with a UE Context and/or a network ID (NW ID).

In Step S108, the WLAN apparatus 25 may further associate a WLAN MAC address of the identified UE 100.

In Step S109, the WLAN apparatus 25 transmits, to the UE 100, data addressed to the UE 100 that is transferred from the eNB 200, using a result of association in Step S107 (and Step S108).

(2) Operation Pattern 2

Figure 10:
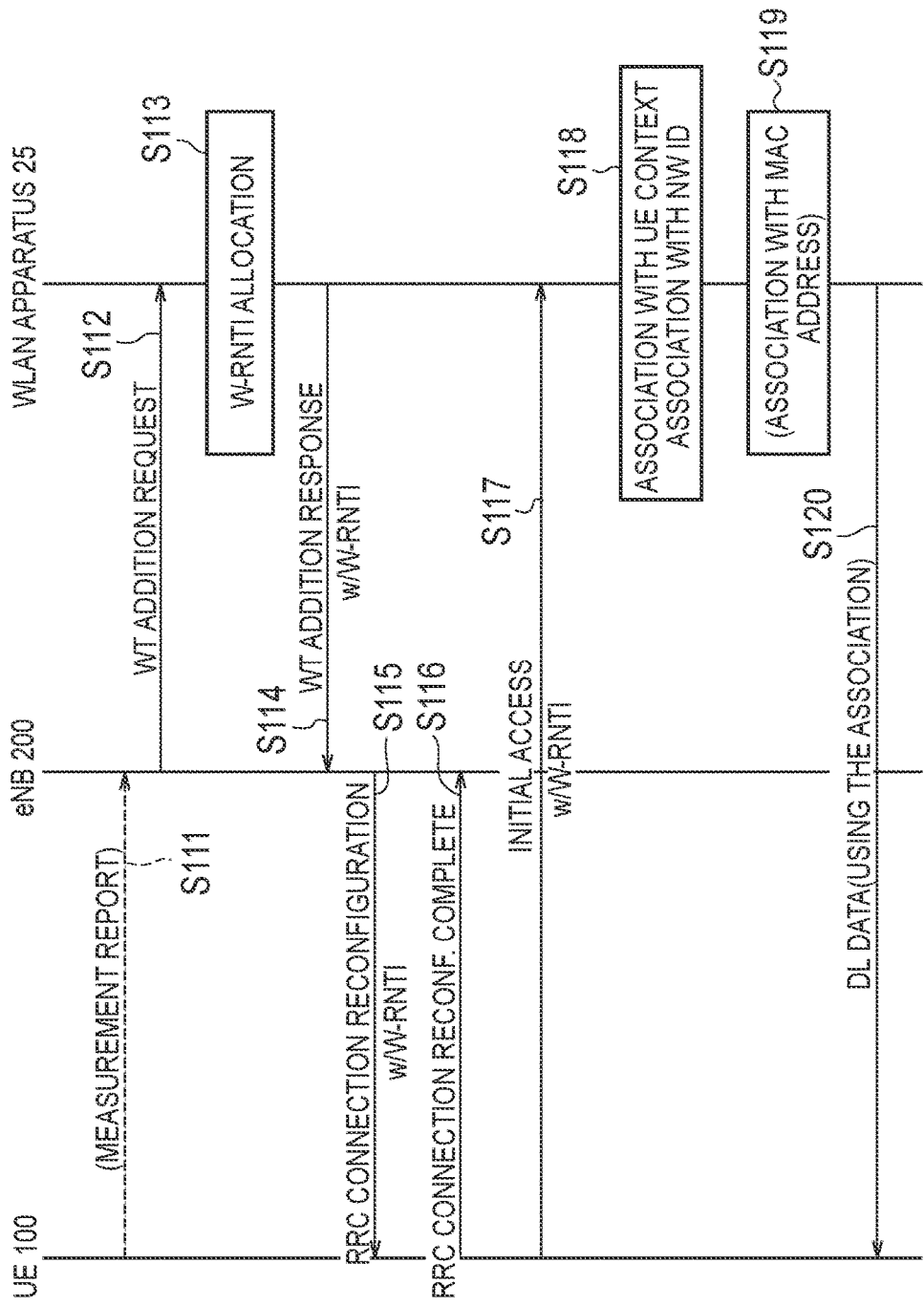
FIG. 10 is a sequence diagram illustrating an operation pattern 2 of the first embodiment.

FIG. 10 is a sequence diagram illustrating an operation pattern 2 of the first embodiment. In the operation pattern 2, temporary UE identification information is a W-RNTI.

As illustrated in FIG. 10, in Step S111, the UE 100 transmits, to the eNB 200, a measurement report (Measurement Report) including a measurement result for the WLAN 20 (the WLAN AP 300). Based on the measurement report (Measurement Report), the eNB 200 decides to start WWAN-WLAN aggregation. The eNB 200 may make the decision based on a determination criterion other than the measurement report (Measurement Report).

In Step S112, the eNB 200 transmits, to the WLAN apparatus 25, on the Xw interface, an addition request (WT Addition Request) for starting WWAN-WLAN aggregation. The addition request (WT Addition Request) includes context information (UE Context) of the UE 100. If the WLAN apparatus 25 receives the addition request (WT Addition Request), the WLAN apparatus 25 stores the UE Context of the UE 100.

In Step S113, the WLAN apparatus 25 allocates a W-RNTI to the UE 100. In addition, the WLAN apparatus 25 performs allocation of a network ID of the UE 100 to be used on the Xw interface. The network ID may be referred to as an "Xw AP UE ID".

In Step S114, the WLAN apparatus 25 transmits, to the eNB 200, on the Xw interface, a positive response (WT Addition Response) to the addition request (WT Addition Request). The positive response (WT Addition Response) includes the W-RNTI and "Xw AP UE ID" that have been allocated to the UE 100 by the WLAN apparatus 25. The eNB 200 receives the positive response (WT Addition Response).

In Step S115, the eNB 200 transmits, to the UE 100, a message requesting WLAN access for starting WWAN-WLAN aggregation. The UE 100 receives the message. The message is, for example, "RRC Connection Reconfiguration" being dedicated RRC signaling addressed to the UE 100. The "RRC Connection Reconfiguration" includes the W-RNTI allocated to the UE 100 by the WLAN apparatus 25. Alternatively, "RRC Connection Reconfiguration" may include an "Xw AP UE ID". In addition, the "RRC Connection Reconfiguration" may include information indicating the WLAN apparatus 25 that the UE 100 is to access.

In Step S116, the UE 100 transmits to the eNB 200, a positive response (RRC Connection Reconfiguration Complete) to the "RRC Connection Reconfiguration". The eNB 200 receives the "RRC Connection Reconfiguration Complete".

In Step S117, the UE 100 performs access (Initial Access) to the WLAN 20 based on the "RRC Connection Reconfiguration". Here, the UE 100 includes the W-RNTI in the LLC header and/or the SNAP header. The W-RNTI is desirably one byte (or six bits), for example. In this case, the UE 100 includes the W-RNTI in the DSAP field (one byte) in the LLC header, for example. Alternatively, the UE 100 may include the "Xw AP UE ID" in the LLC header and/or the SNAP header.

The WLAN LLC entity of the WLAN apparatus 25 acquires the W-RNTI (or "Xw AP UE ID") included in the LLC header and/or the SNAP header, and identifies the UE 100 that has accessed the WLAN 20, based on the W-RNTI (or "Xw AP UE ID"). More specifically, the WLAN LLC entity determines that the W-RNTI (or "Xw AP UE ID") allocated in Step S113, and the W-RNTI (or "Xw AP UE ID") included in the LLC header and/or the SNAP header match.

In Step S118, the WLAN apparatus 25 associates the identified UE 100 with a UE Context and/or a network ID.

In Step S119, the WLAN apparatus 25 may further associate a WLAN MAC address of the identified UE 100.

In Step S120, the WLAN apparatus 25 transmits, to the UE 100, data addressed to the UE 100 that is transferred from the eNB 200, using a result of association in Step S117 (and Step S118).

Modified Example 1 of First Embodiment

In the aforementioned first embodiment, the description has been given of an example in which access performed by the UE 100 to the WLAN 20 is initial access (Initial Access). Nevertheless, the aforementioned operation according to the first embodiment may be performed in second or subsequent WLAN access.

Alternatively, access involving the notification of UE identification information according to the first embodiment may be limited to initial access. In this case, it may be defined that, if WWAN-WLAN aggregation is newly designated from the eNB 200, the UE 100 needs to perform notification of UE identification information. In addition, the WLAN apparatus 25 may delete UE identification information when the identification of the UE 100 ends.

Modified Example 2 of First Embodiment

In the aforementioned first embodiment, the description has been given of an example in which a C-RNTI is used as UE identification information to be included in the notification transmitted when the UE 100 performs access to the WLAN 20, and an example in which a W-RNTI (or Xw AP UE ID) is used as the UE identification information.

Nevertheless, a MAC address, an international mobile subscriber identity (IMSI), an IP address, and the like may be used as UE identification information to be included in the notification transmitted when the UE 100 performs access to the WLAN 20. Nevertheless, these are not desirable because these have a larger numbers of bytes than those of the C-RNTI, the W-RNTI, and the like.

Modified Example 3 of First Embodiment

The aforementioned operation according to the first embodiment may be limited to only a case in which information such as "LTE PDCP PDU" is included in the type field (new EtherType) of the SNAP header.

Second Embodiment

A second embodiment will be described below mainly based on a difference from the first embodiment.

(WWAN-WLAN Aggregation According to Second Embodiment)

Figure 11:
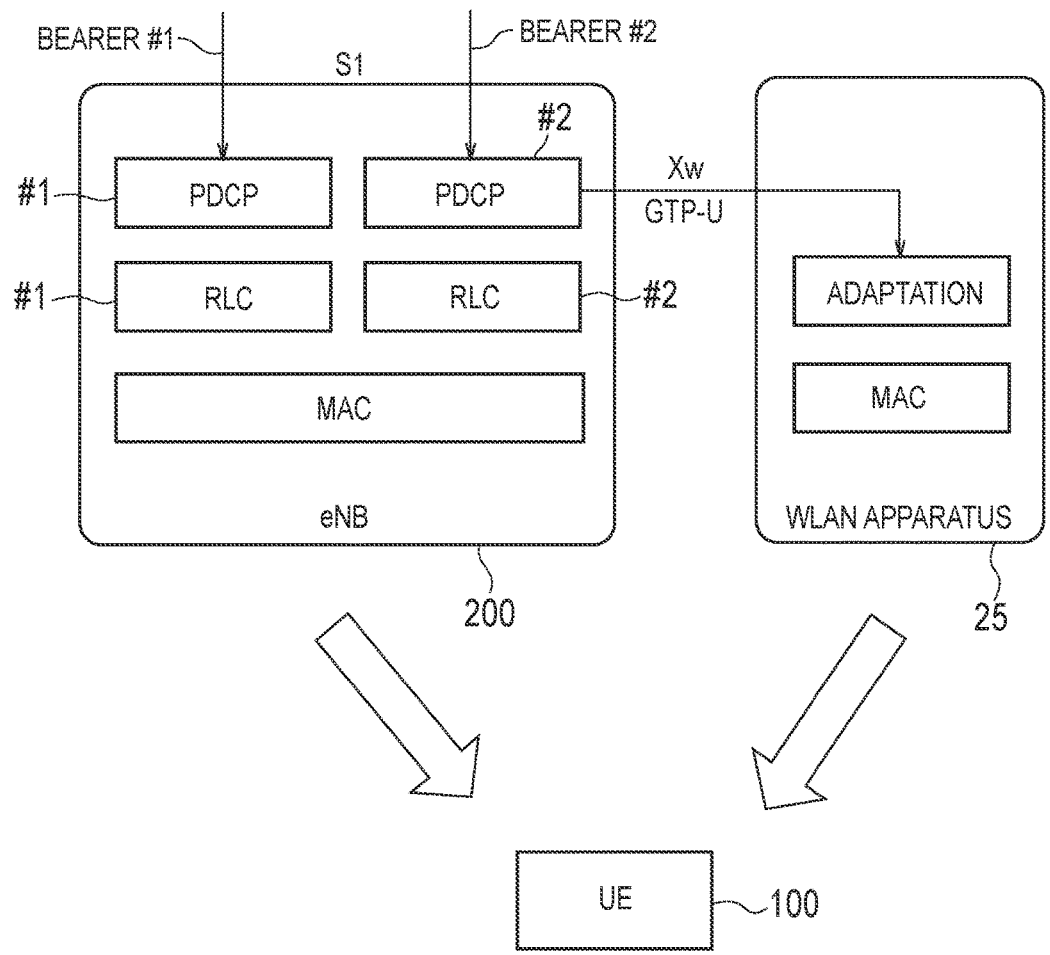
FIG. 11 is a diagram illustrating WWAN-WLAN aggregation according to the second embodiment.

FIG. 11 is a diagram illustrating WWAN-WLAN aggregation according to the second embodiment. The WWAN-WLAN aggregation of downlink will now be described. Nevertheless, WWAN-WLAN aggregation can be applied to uplink.

As illustrated in FIG. 11, the WLAN apparatus 25 according to the second embodiment includes, as an entity of a predetermined layer, an adaptation (Adaptation) layer entity in place of the WLAN LLC entity according to the first embodiment. The adaptation layer is a protocol defined by a WWAN standard (3GPP standard).

Other configurations are similar to the configuration of the WWAN-WLAN aggregation according to the first embodiment. More specifically, in the WWAN-WLAN aggregation according to the first embodiment (refer to FIG. 6), the "WLAN LLC entity" can be read as the "adaptation layer entity".

(Operation According to Second Embodiment)

An operation according to the second embodiment will be described below.

When starting WWAN-WLAN aggregation, the UE 100 performs access (initial access) to the WLAN 20 in a state of being connected to the eNB 200 (i.e., in an RRC connected mode). Here, the adaptation layer entity of the WLAN apparatus 25 needs to associate UE identification information (hereinafter, "network ID") and the like that are to be used for the GTP-U with the eNB 200, with a UE 100 that has accessed the WLAN 20. Nevertheless, a method by which the adaptation layer entity identifies a UE 100 that has accessed the WLAN 20 is unclear at the present moment.

Thus, when performing access to the WLAN 20 in a state in which the own UE 100 is connected to the eNB 200, the UE 100 notifies the adaptation layer entity of terminal identification information (UE identification information) of the own UE 100. In the second embodiment, the UE 100 notifies the adaptation layer entity of UE identification information by including the UE identification information in a control protocol data unit (PDU) of the adaptation layer that is transmitted by the own UE 100 to the WLAN 20. The adaptation layer entity can thereby identify the UE 100 based on the UE identification information.

The UE identification information is temporary UE identification information allocated to the own UE 100 from the eNB 200 or the WLAN 20. The UE 100 performs processing of acquiring temporary UE identification information from the eNB 200, and processing of notifying the WLAN LLC entity of the temporary UE identification information when performing access to the WLAN 20 in a state in which the own UE 100 is connected to the eNB 200. The temporary UE identification information allocated to the UE 100 from the eNB 200 is, for example, a cell radio network temporary identifier (C-RNTI). In addition, the temporary UE identification information allocated to the UE 100 from the WLAN 20 may be referred to as a WLAN radio network temporary identifier (W-RNTI). Alternatively, the UE identification information may be identification information fixedly allocated to the UE 100. The identification information fixedly allocated to the UE 100 is, for example, a WLAN MAC address of the UE 100.

(1) Adaptation Layer Control PDU

Figure 12:
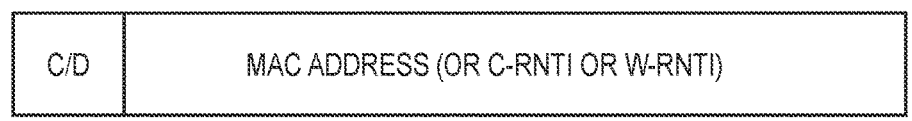
FIG. 12 is a diagram for illustrating an adaptation layer control protocol data unit (PDU) according to the second embodiment.

FIG. 12 is a diagram for illustrating an adaptation layer control PDU according to the second embodiment.

As illustrated in FIG. 12, the adaptation layer PDU transmitted to the WLAN 20 by the UE 100 includes a one-bit C/D field representing "0" indicating that the PDU is a control PDU, or "1" indicating that the PDU is a data PDU, and a field storing UE identification information of the UE 100. Here, an example in which UE identification information is a WLAN MAC address is illustrated. Nevertheless, UE identification information may be a C-RNTI, a W-RNTI, or the like.

When performing access (initial access) to the WLAN 20, the UE 100 sets the C/D field to "0", and notifies the adaptation layer entity of an adaptation layer PDU in which a WLAN MAC address of the UE 100 is set in the MAC address field (i.e., adaptation layer control PDU). In other words, as for the initial access to the WLAN 20, the UE 100 starts transmission from the adaptation layer control PDU.

(2) Operation Patterns 1 to 3

Figure 13:
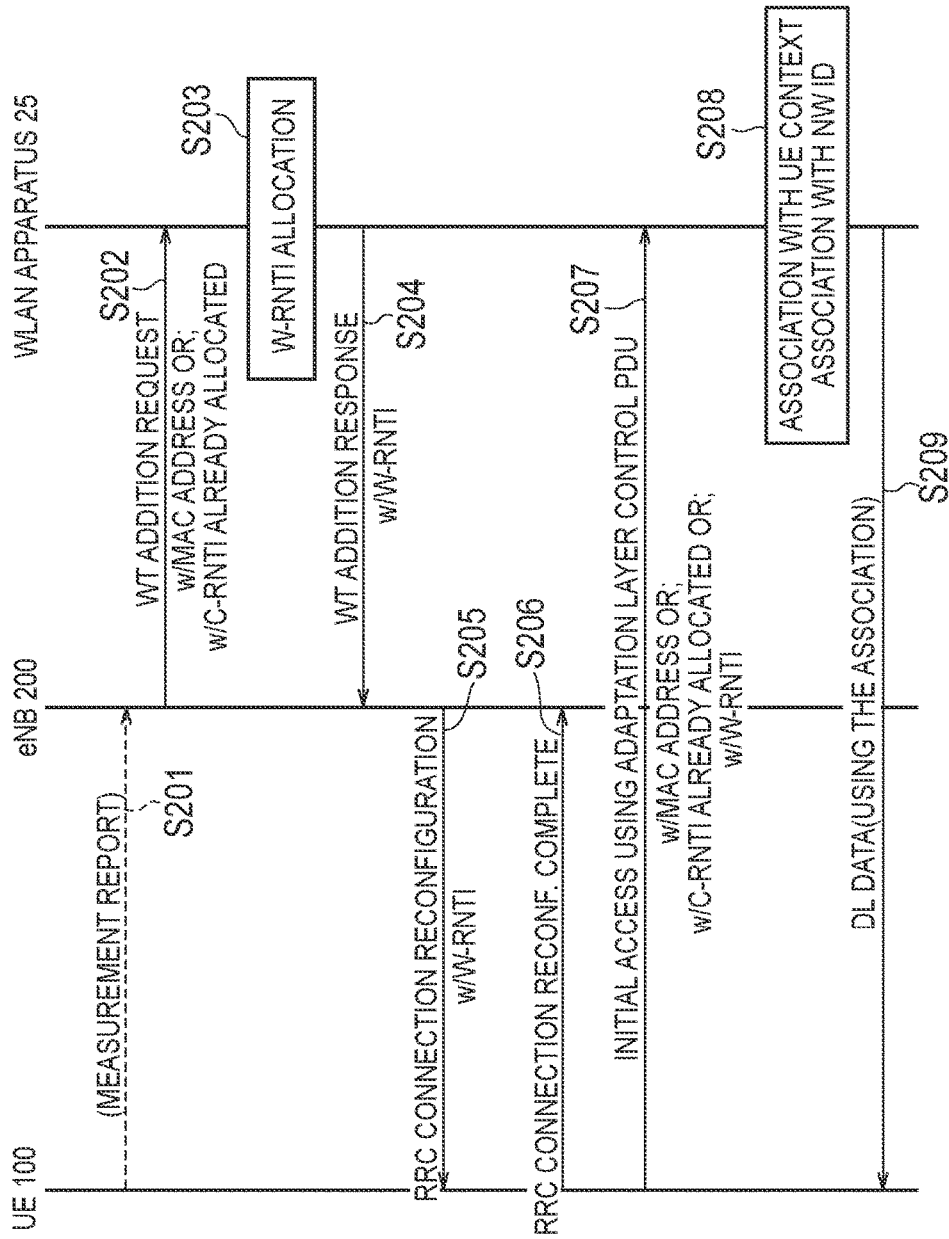
FIG. 13 is a sequence diagram illustrating operation patterns 1 to 3 of the second embodiment.

FIG. 13 is a sequence diagram illustrating operation patterns 1 to 3 of the second embodiment.

In the operation pattern 1, UE identification information is a C-RNTI. In this case, "MAC Address" and "W-RNTI" illustrated in FIG. 13 are unnecessary, and Step S203 illustrated in FIG. 13 is also unnecessary. If UE identification information is a C-RNTI, in the operation pattern 1 of the first embodiment, "WLAN LLC entity" can be read as "adaptation layer entity", and "LLC header and/or SNAP header" can be read as "adaptation layer control PDU".

In the operation pattern 2, UE identification information is a W-RNTI. In this case, "MAC Address" and "C-RNTI" illustrated in FIG. 13 are unnecessary. If UE identification information is a W-RNTI, in the operation pattern 2 of the first embodiment, "WLAN LLC entity" can be read as "adaptation layer entity", and "LLC header and/or SNAP header" can be read as "adaptation layer control PDU".

In the operation pattern 3, UE identification information is a WLAN MAC address. In this case, "C-RNTI" and "W-RNTI" illustrated in FIG. 13 are unnecessary, and Step S203 illustrated in FIG. 13 is also unnecessary. An operation performed if UE identification information is a WLAN MAC address will be described below.

As illustrated in FIG. 13, in Step S201, the UE 100 transmits, to the eNB 200, a measurement report (Measurement Report) including a measurement result for the WLAN 20 (the WLAN AP 300). Based on the measurement report (Measurement Report), the eNB 200 decides to start WWAN-WLAN aggregation. The eNB 200 may make the decision based on a determination criterion other than the measurement report (Measurement Report).

In Step S202, the eNB 200 transmits, to the WLAN apparatus 25, on the Xw interface, an addition request (WT Addition Request) for starting WWAN-WLAN aggregation. The addition request (WT Addition Request) includes context information (UE Context) of the UE 100. In addition, the addition request (WT Addition Request) includes a WLAN MAC address of the UE 100. In addition, the eNB 200 recognizes the WLAN MAC address of the UE 100 in advance. Such a method will be described in the third embodiment.

If the WLAN apparatus 25 receives the addition request (WT Addition Request), the WLAN apparatus 25 stores the UE Context and the WLAN MAC address of the UE 100. In addition, the WLAN apparatus 25 performs allocation of a network ID of the UE 100 to be used on the Xw interface. The network ID may be referred to as an "Xw AP UE ID".

Step S203 is omitted, and in Step S204, the WLAN apparatus 25 transmits, to the eNB 200, on the Xw interface, a positive response (WT Addition Response) to the addition request (WT Addition Request). The positive response (WT Addition Response) includes the network ID allocated to the UE 100 by the WLAN apparatus 25. The eNB 200 receives the positive response (WT Addition Response).

In Step S205, the eNB 200 transmits, to the UE 100, a message requesting WLAN access for starting WWAN-WLAN aggregation. The UE 100 receives the message. The message is, for example, "RRC Connection Reconfiguration" being dedicated RRC signaling addressed to the UE 100. The "RRC Connection Reconfiguration" may include information indicating the WLAN apparatus 25 that the UE 100 is to access.

In Step S206, the UE 100 transmits, to the eNB 200, a positive response (RRC Connection Reconfiguration Complete) to the "RRC Connection Reconfiguration". The eNB 200 receives the "RRC Connection Reconfiguration Complete".

In Step S207, the UE 100 performs access (Initial Access) to the WLAN 20 based on the "RRC Connection Reconfiguration". Here, the UE 100 includes a WLAN MAC address of itself in the adaptation layer control PDU. The adaptation layer entity of the WLAN apparatus 25 acquires the WLAN MAC address included in the adaptation layer control PDU, and identifies the UE 100 that has accessed the WLAN 20, based on the WLAN MAC address. More specifically, the adaptation layer entity determines that the WLAN MAC address included in the notification transmitted from the eNB 200 in Step S202, and the WLAN MAC address included in the adaptation layer control PDU match.

In Step S208, the WLAN apparatus 25 associates the identified UE 100 with a UE Context and/or a network ID (NW ID).

In Step S209, the WLAN apparatus 25 transmits, to the UE 100, data addressed to the UE 100 that is transferred from the eNB 200, using a result of association in Step S208.

Third Embodiment

A third embodiment will be described below mainly based on a difference from the first and second embodiments.

(WWAN-WLAN Aggregation According to Third Embodiment)

Figure 14:
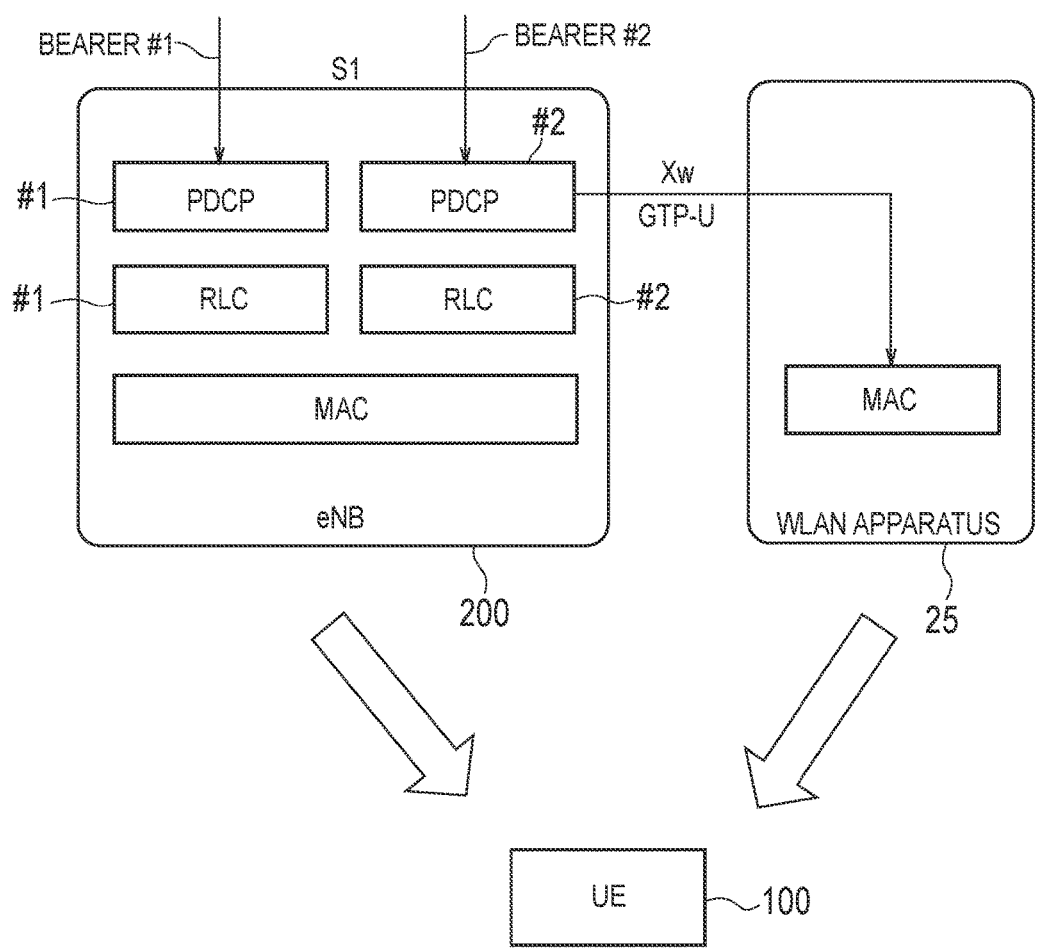
FIG. 14 is a diagram illustrating WWAN-WLAN aggregation according to the third embodiment.

FIG. 14 is a diagram illustrating WWAN-WLAN aggregation according to the third embodiment. The WWAN-WLAN aggregation of downlink will now be described. Nevertheless, WWAN-WLAN aggregation can be applied to uplink.

As illustrated in FIG. 14, the WLAN apparatus 25 according to the third embodiment does not include an entity of a predetermined layer (WLAN LLC entity, adaptation layer entity) as described in the first embodiment and the second embodiment. In other words, the WLAN MAC entity directly acquires, from the eNB 200, data (PDCP PDU) transferred to the WLAN apparatus 25 on the Xw interface. Then, the WWAN MAC entity processes the data from the eNB 200, and transmits the processed data to the UE 100 via an entity (not illustrated) of a physical layer. Other configurations are similar to those in the first embodiment and the second embodiment.

In the case of such a configuration, the WLAN MAC entity can identify a transmission source MAC address in a MAC header (Ethernet header) transmitted from the UE 100. Thus, if the WLAN MAC entity acquires a WLAN MAC address of the UE 100 from the eNB 200 in advance, the WLAN MAC entity can identify the UE 100 that has accessed the WLAN 20.

(Operation According to Third Embodiment)

The UE 100 transmits, to the eNB 200, terminal capability information (UE Capability) related to capability of the own UE 100. The terminal capability information (UE Capability) transmitted to the eNB 200 by the UE 100 is generally information related to capability of the UE 100 that is related to WWAN (LTE).

The UE 100 according to the third embodiment includes UE identification information fixedly allocated to the own UE 100, in capability information. The UE identification information is a WLAN MAC address of the UE 100. Alternatively, UE identification information may be an IMSI.

If the own UE 100 has capability of WWAN-WLAN aggregation, the UE 100 may include UE identification information (WLAN MAC address) in terminal capability information (UE Capability). If a WLAN MAC address is included in terminal capability information (UE Capability), the eNB 200 may determine that the UE 100 has capability of WWAN-WLAN aggregation.

Figure 15:
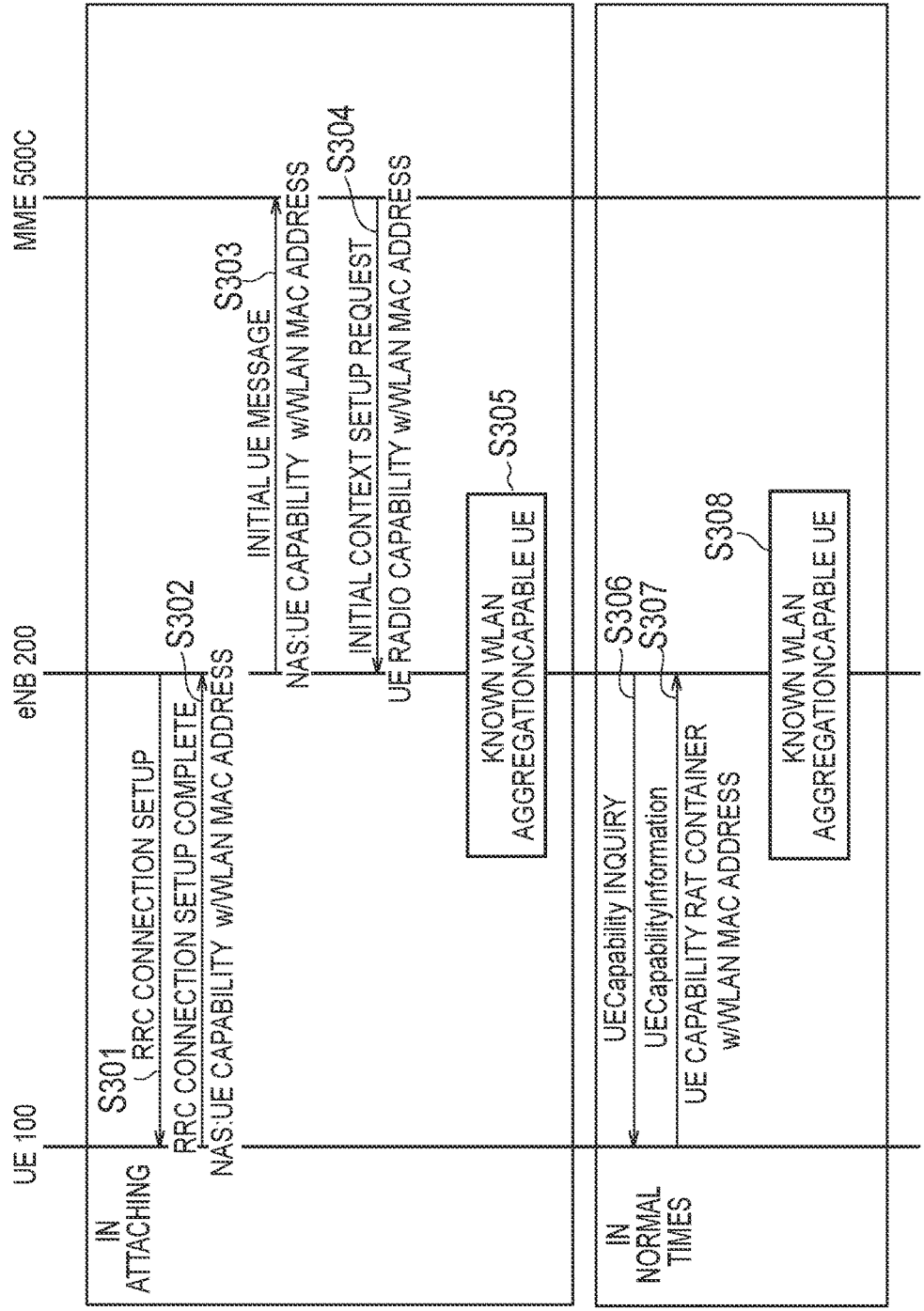
FIG. 15 is a sequence diagram illustrating an operation according to the third embodiment.

FIG. 15 is a sequence diagram illustrating an operation according to the third embodiment.

As illustrated in FIG. 15, Steps S301 to S305 indicate operations performed when the UE 100 attaches to a WWAN (LTE network).

In Step S301, the eNB 200 transmits an RRC connection setup (RRC Connection Setup) message to the UE 100.

In Step S302, the UE 100 transmits an RRC connection setup complete (RRC Connection Setup Complete) message to the eNB 200. In addition, the UE 100 transmits terminal capability information (UE Capability) to the eNB 200 using an NAS message. The terminal capability information (UE Capability) includes the WLAN MAC address of the UE 100.

In Step S303, the eNB 200 transmits, to an MME 500C, a message indicating UE initial access (Initial UE Message). In addition, the eNB 200 transfers the NAS message received from the UE 100, to the MME 500C. The MME 500C stores the terminal capability information (UE Capability) included in the NAS message. The MME 500C holds the terminal capability information (UE Capability) until the UE 100 detaches.

In Step S304, the MME 500C transmits a UE initial context setup request (Initial Context Setup Request) message to the eNB 200. In addition, the MME 500C notifies the eNB 200 of the WLAN MAC address of the UE 100 as part of radio capability of the UE 100 (UE Radio Capability).

In Step S305, because the WLAN MAC address is included in the radio capability of the UE 100 (UE Radio Capability), the eNB 200 determines that the UE 100 has capability of WWAN-WLAN aggregation.

Next, Steps S306 to S308 indicate operations (operations in normal times) performed after the UE 100 attaches to the WWAN (LTE network).

In Step S306, the eNB 200 transmits a transmission request of terminal capability information (UE Capability Inquiry) to the UE 100.

In step S307, in response to the reception of the transmission request (UE Capability Inquiry), the UE 100 transmits the terminal capability information (UE Capability Information) to the eNB 200. The terminal capability information (UE Capability Information) includes the WLAN MAC address of the UE 100 as part of "UE Capability RAT Container".

In Step S308, because the WLAN MAC address is included in the "UE Capability RAT Container" of the UE 100, the eNB 200 determines that the UE 100 has capability of WWAN-WLAN aggregation.

Fourth Embodiment

A fourth embodiment will be described below mainly based on a difference from the first to third embodiments.

(Authentication Processing Between UE and WLAN)

Figure 16:
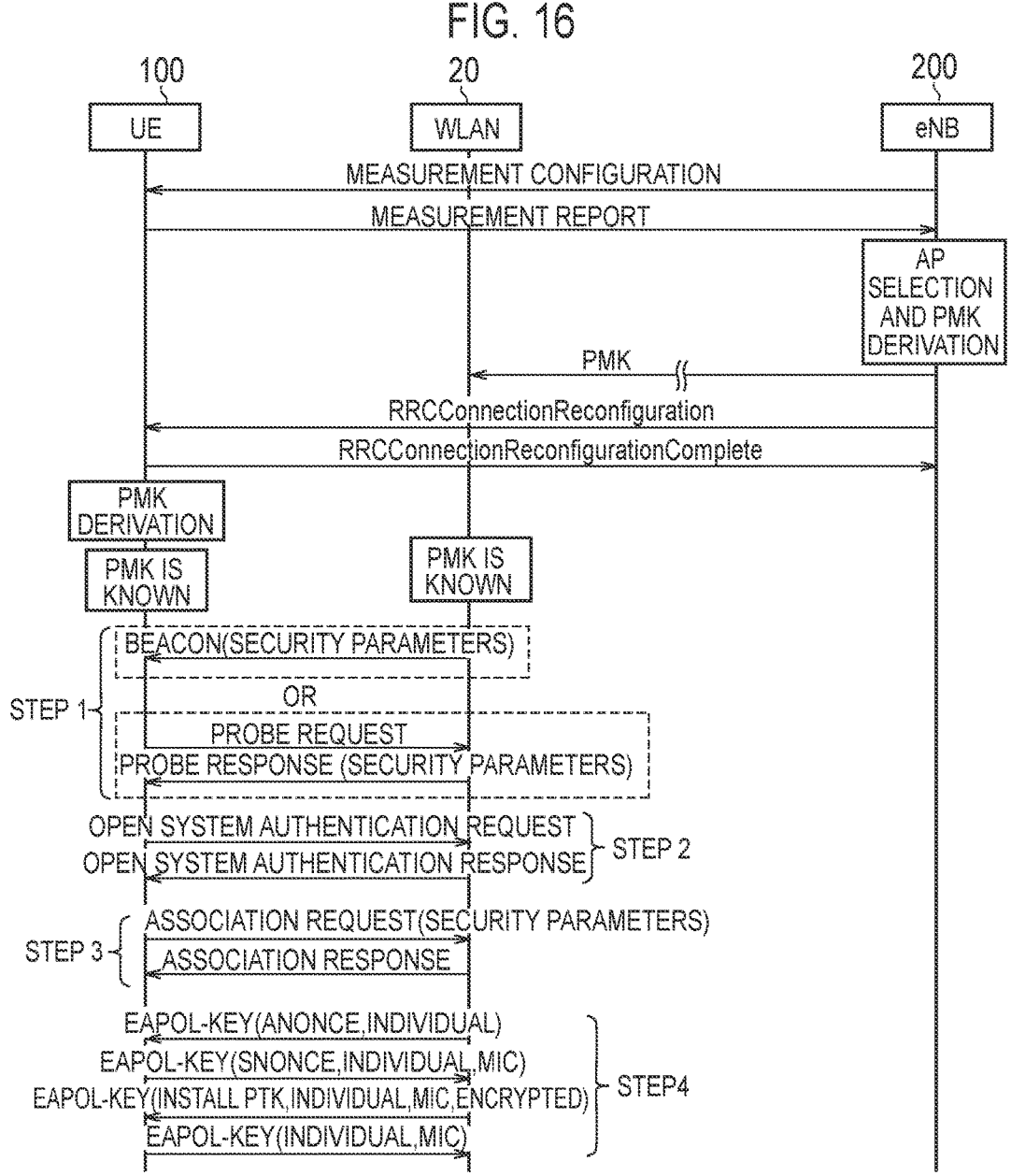
FIG. 16 is a sequence diagram illustrating authentication processing between a UE and a WLAN according to the fourth embodiment.

FIG. 16 is a sequence diagram illustrating authentication processing between a UE and a WLAN according to the fourth embodiment.

As illustrated in FIG. 16, the eNB 200 performs measurement configuration (Measurement Configuration) in the UE 100, receives a measurement report (Measurement Report) from the UE 100, performs selection (AP selection) of the WLAN AP 300 to be accessed by the UE 100, and performs derivation of PMK (PMK derivation). A pairwise master key (PMK) is authentication information used for authentication processing between a UE and a WLAN. Then, the eNB 200 notifies the WLAN 20 of the derived PMK. The eNB 200 may include the PMK in the aforementioned addition request (WT Addition Request), and transmit the request to the WLAN 20. The eNB 200 may notify the WLAN 20 and the UE 100 of the PMK at a timing between Steps 3 and 4 to be described later.

In addition, the eNB 200 transmits, to the UE 100, an "RRC Connection Reconfiguration" message for starting WWAN-WLAN aggregation, and receives an "RRC Connection Reconfiguration Complete" message from the UE 100. Here, the "RRC Connection Reconfiguration" message includes information for the UE 100 deriving the PMK. The UE 100 derives the PMK based on the information.

Next, in Step 1, the UE 100 detects a beacon frame (Beacon) or a probe response (Probe Response) of the WLAN 20, and identifies a WLAN security policy (WEP, WPA, etc.) based on a security parameter included in the beacon frame or the probe response.

In Step 2, the UE 100 performs open system authentication (Open System authentication) with the WLAN 20.

In Step 3, the UE 100 starts an "Association procedure", notifies the WLAN 20 of the WLAN security policy selected by the own UE 100, and receives a response (Association Response) from the WLAN 20.

In Step 4, the UE 100 and the WLAN 20 perform a hand shake procedure. More specifically, the WLAN 20 transmits, to the UE 100, an EAPOL-Key including ANonce generated from the PMK, and the UE 100 transmits, to the WLAN 20, an EAPOL-Key including SNonce generated from the PMK. Then, the WLAN 20 derives, from the ANonce and the SNonce, encryption key information (PTK: Pairwise Transient Key) for unicast communication, and transmits the EAPOL-Key including the PTK, to the UE 100, and the UE 100 transmits the EAPOL-Key to the WLAN 20 in response to this.

(Operation According to Fourth Embodiment)

As described above, in the authentication processing between the UE and the WLAN, by the eNB 200 notifying the WLAN 20 (the WLAN apparatus 25) and the UE 100 of the PMK, authentication between the WLAN 20 (the WLAN apparatus 25) and the UE 100 can be performed.

In the fourth embodiment, in response to the reception of the addition request (WT Addition Request) from the eNB 200, the WLAN apparatus 25 stores a UE Context included in the addition request (WT Addition Request). In addition, the WLAN apparatus 25 performs allocation of a network ID of the UE 100 to be used on the Xw interface with the eNB 200. The network ID may be referred to as an "Xw AP UE ID".

The WLAN apparatus 25 stores the PMK received from the eNB 200, in association with the "Xw AP UE ID" and the UE Context. In other words, the WLAN apparatus 25 stores authentication information (PMK) to be used for authentication processing with the UE 100 connecting to the eNB 200, and UE identification information (Xw AP UE ID and/or UE Context) of the UE 100. Then, if the UE 100 accesses (initially accesses) the own WLAN apparatus 25, and succeeds in authentication processing using the authentication information (PMK), the WLAN apparatus 25 associates the UE 100 with the UE identification information (Xw AP UE ID and/or UE Context).

Thus, according to the fourth embodiment, the WLAN apparatus 25 can identify the UE 100 using the authentication processing between the UE and the WLAN.

Modified Example of Fourth Embodiment

In the aforementioned fourth embodiment, the description has been given of an example in which the eNB 200 provides the PMK to the WLAN apparatus 25 and the UE 100. Nevertheless, the WLAN apparatus 25 may generate a PMK, and share the PMK with the UE 100.

Figure 17:
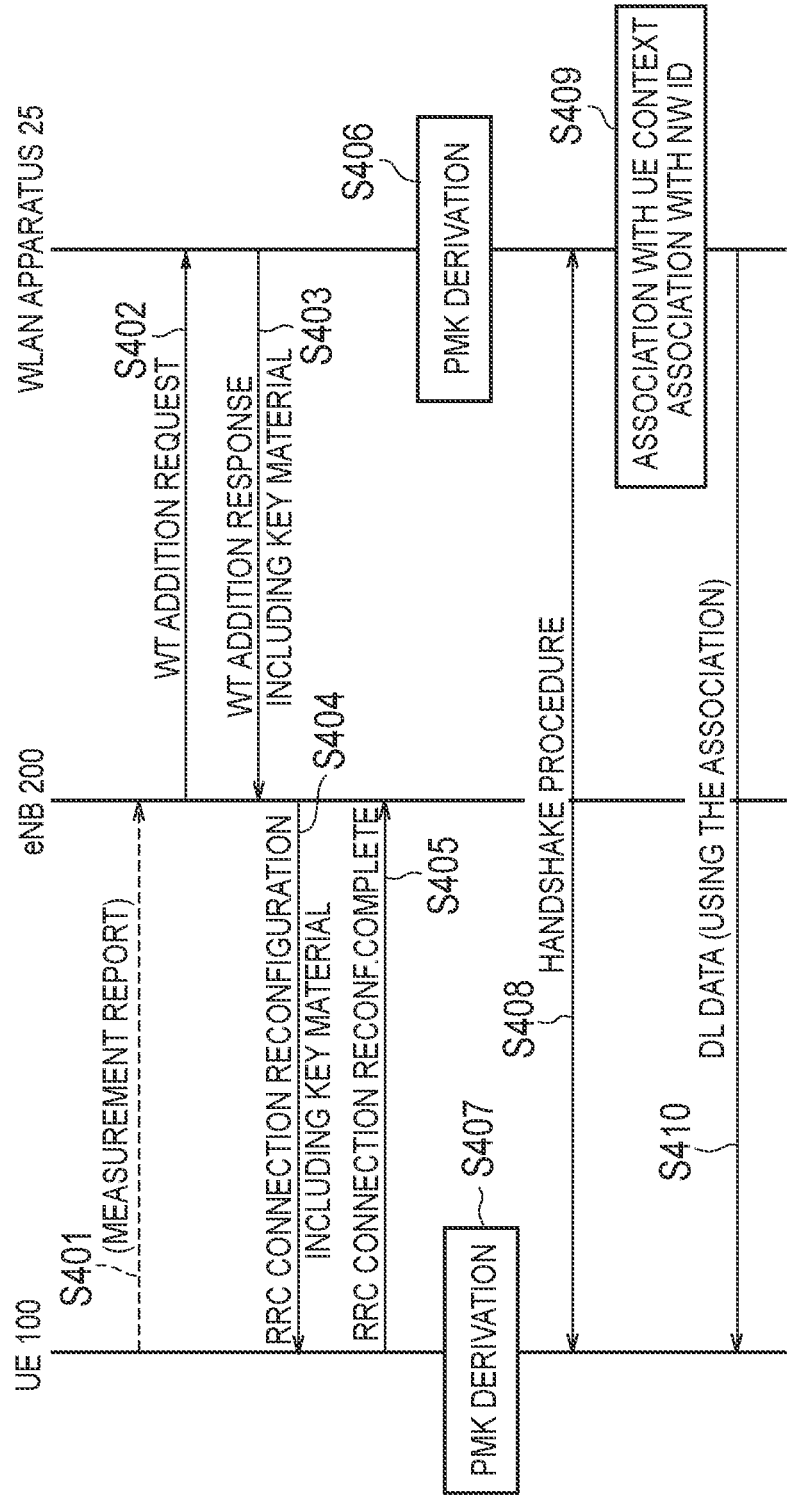
FIG. 17 is a sequence diagram illustrating a modified example of the fourth embodiment.

FIG. 17 is a sequence diagram illustrating a modified example of the fourth embodiment.

As illustrated in FIG. 17, in Step S401, the UE 100 transmits, to the eNB 200, a measurement report (Measurement Report) including a measurement result for the WLAN 20 (the WLAN AP 300). Based on the measurement report (Measurement Report), the eNB 200 decides to start WWAN-WLAN aggregation. The eNB 200 may make the decision based on a determination criterion other than the measurement report (Measurement Report).

In Step S402, the eNB 200 transmits, to the WLAN apparatus 25, on the Xw interface, an addition request (WT Addition Request) for starting WWAN-WLAN aggregation. The addition request (WT Addition Request) includes context information (UE Context) of the UE 100. If the WLAN apparatus 25 receives the addition request (WT Addition Request), the WLAN apparatus 25 stores the UE Context of the UE 100.

The WLAN apparatus 25 generates information (Key material) for deriving the PMK. In addition, the WLAN apparatus 25 performs allocation of a network ID (Xw AP UE ID) of the UE 100 to be used on the Xw interface.

In Step S403, the WLAN apparatus 25 transmits, to the eNB 200, on the Xw interface, a positive response (WT Addition Response) to the addition request (WT Addition Request). The positive response (WT Addition Response) includes information (Key material) for deriving the PMK, and an "Xw AP UE ID". The eNB 200 receives the positive response (WT Addition Response).

In Step S404, the eNB 200 transmits, to the UE 100, a message requesting WLAN access for starting WWAN-WLAN aggregation. The UE 100 receives the message. The message is, for example, "RRC Connection Reconfiguration" being dedicated RRC signaling addressed to the UE 100. The "RRC Connection Reconfiguration" includes information (Key material) for deriving the PMK.

In Step S405, the UE 100 transmits, to the eNB 200, a positive response (RRC Connection Reconfiguration Complete) to the "RRC Connection Reconfiguration". The eNB 200 receives the "RRC Connection Reconfiguration Complete".

In Step S406, the WLAN apparatus 25 derives the PMK based on the "Key material".

In Step S407, the UE 100 derives the PMK based on the "Key material".

In Step S408, the UE 100 performs access (Initial Access) to the WLAN 20 based on the "RRC Connection Reconfiguration". The UE 100 and the WLAN apparatus 25 perform the aforementioned hand shake procedure (authentication processing) using the PMK. The description will now be given assuming that the hand shake procedure (authentication processing) has succeeded.

Based on the PMK used in the authentication processing, the WLAN apparatus 25 identifies the UE 100 that has accessed the WLAN 20. More specifically, the WLAN apparatus 25 determines that the PMK corresponding to the "Key material" included in the notification transmitted in Step S403, and the PMK used in the authentication processing match.

In Step S409, the WLAN apparatus 25 associates the identified UE 100 with a UE Context and/or a network ID (Xw AP UE ID). The WLAN apparatus 25 may further associate a WLAN MAC address of the identified UE 100.

In Step S410, the WLAN apparatus 25 transmits, to the UE 100, data addressed to the UE 100 that is transferred from the eNB 200, using a result of association in Step S409.

According to the modified example of the fourth embodiment, a PMK can be uniquely decided between the WT 400 and the UE 100. In addition, in the aforementioned fourth embodiment, because the eNB 200 generates a PMK, if the WLAN apparatus 25 has a plurality of eNBs 200 and Xw interfaces, the PMK may fail to become unique. For example, the WLAN apparatus 25 disposed at the end of the cell coverage of a plurality of eNBs 200 may receive a PMK from the plurality of eNBs 200.

Other Embodiments

In the aforementioned embodiments, the LTE system has been described as an example of a WWAN system. Nevertheless, the present disclosure is not limited to the LTE system. The present disclosure may be applied to a WWAN system other than the LTE system.

INDUSTRIAL APPLICABILITY

The present disclosure is useful in a radio communication field.

The invention claimed is:

1. A communication method, comprising:
generating, by an LTE base station configured to include a Wireless Wide Area Network (WWAN), authentication information to be used for authentication processing between a WLAN apparatus configured to include a Wireless Local Area Network (WLAN) and a radio terminal configured to support WWAN-WLAN aggregation in which communication by using of the WWAN and the WLAN is performed, wherein the generating the authentication information comprises generating, by the LTE base station, a Pairwise Master Key (PMK);
transmitting, by the LTE base station, a WLAN Termination (WT) ADDITION REQUEST to the WLAN apparatus on an Xw interface, wherein the Xw interface is a direct interface between the eNB and the WT, and the WT ADDITION REQUEST includes the PMK and a WLAN media access control (MAC) address of the radio terminal;
receiving, by the WLAN apparatus, the WT ADDITION REQUEST from the LTE base station on the Xw interface;
transmitting, by the LTE base station, an Radio Resource Control (RRC) message including information for deriving the PMK, to the radio terminal;
receiving, by the radio terminal, the RRC message from the LTE base station;
assigning, by the WLAN apparatus, a Xw AP UE ID to the radio terminal, the Xw AP UE ID identifying the radio terminal over the Xw interface;
transmitting, by the WLAN apparatus, a response message to the LTE base station in response to receiving the WT ADDITION REQUEST, the response message including the Xw AP UE ID;
deriving, by the radio terminal, the PMK based on the information included in the RRC message; and
performing, by the radio terminal, the authentication processing by using the PMK.

2. An LTE base station configured to include a Wireless Wide Area Network (WWAN), comprising a controller, wherein
the controller of the LTE base station is configured to:
generate authentication information to be used for authentication processing between a WLAN apparatus configured to include a Wireless Local Area Network (WLAN) and a radio terminal configured to support WWAN-WLAN aggregation in which communication by using the WWAN and the WLAN is performed, wherein the authentication information is a Pairwise Master Key (PMK);
transmit a WLAN Termination (WT) ADDITION REQUEST to the WLAN apparatus on an Xw interface, wherein the Xw interface is a direct interface between the eNB and the WT, and the WT ADDITION REQUEST includes the PMK and a WLAN media access control (MAC) address of the radio terminal;
receive a response message from the WLAN apparatus on the Xw interface, the response message including an Xw AP UE ID assigned to the radio terminal by the WLAN apparatus, the Xw AP UE ID identifying the radio terminal over the Xw interface; and
transmit an Radio Resource Control (RRC) message including information for deriving the PMK, to the radio terminal.

\* \* \* \* \*